Feb. 9, 1932. W. W. BRISSON 1,844,240
MOTORIZED TRAILER ATTACHMENT
Filed Aug. 23, 1930   2 Sheets-Sheet 2
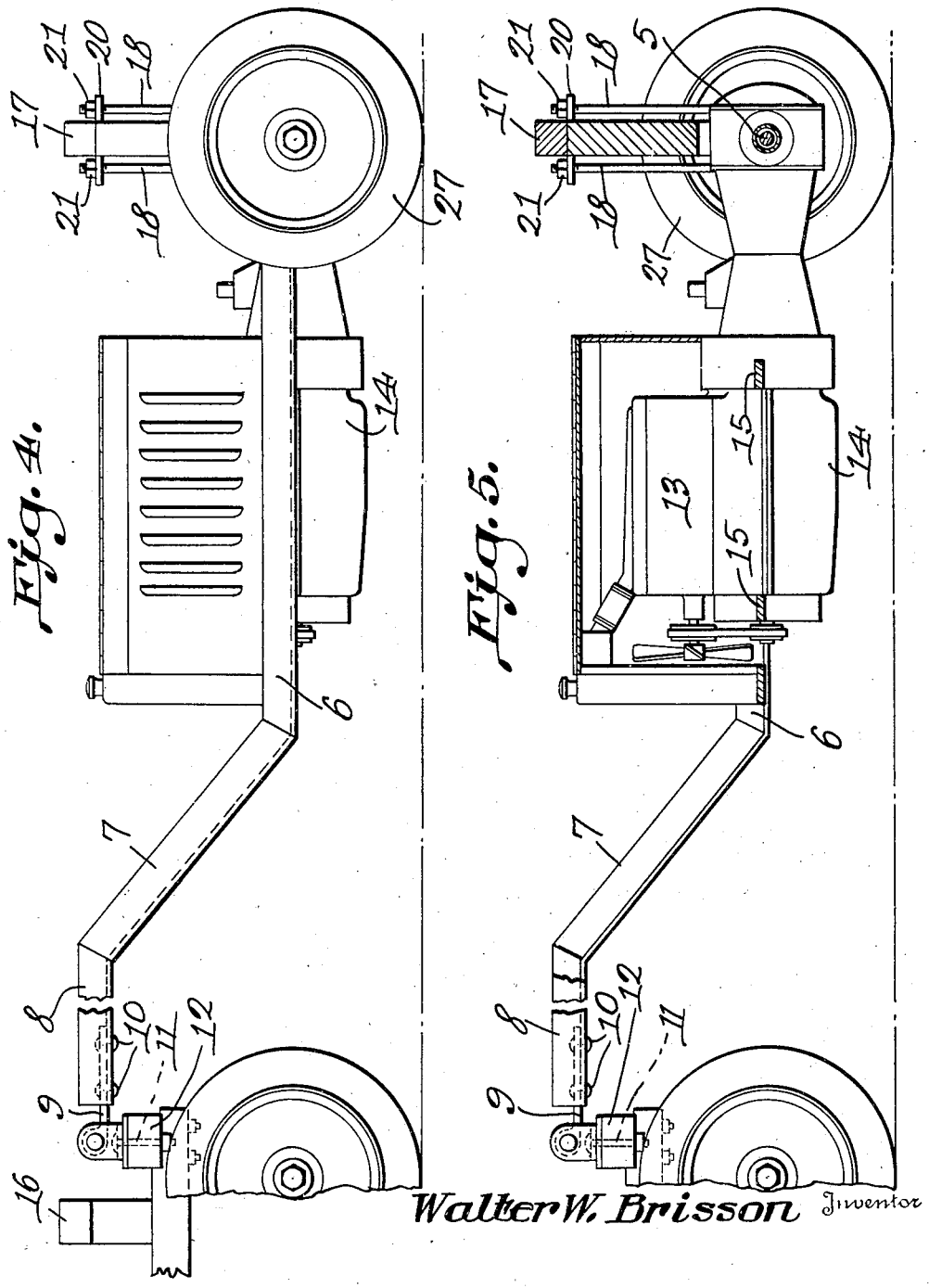

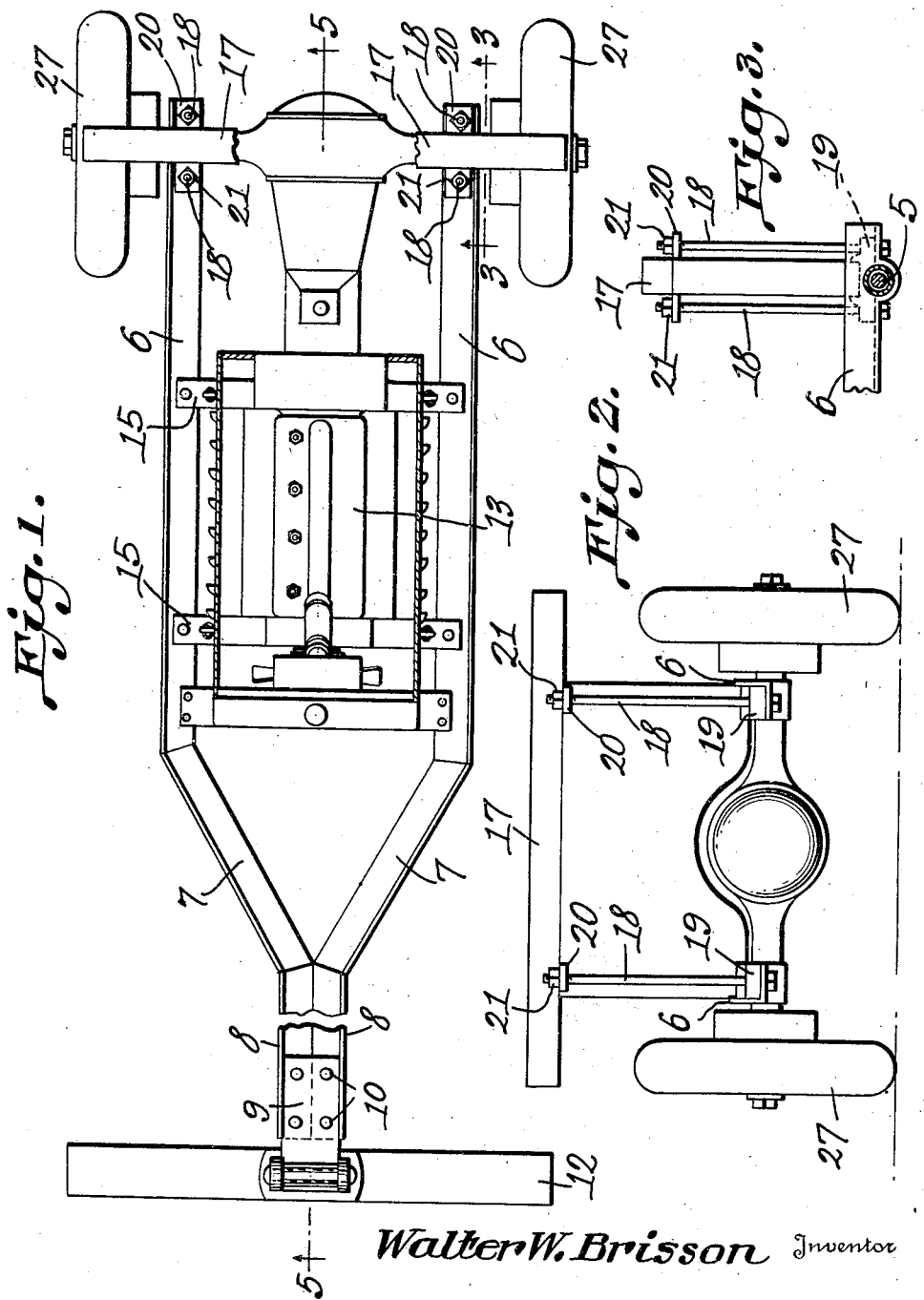

Patented Feb. 9, 1932

1,844,240

UNITED STATES PATENT OFFICE

WALTER WILLIAM BRISSON, OF NORWAY, MICHIGAN

MOTORIZED TRAILER ATTACHMENT

Application filed August 23, 1930. Serial No. 477,417.

This invention relates to trailers used in connection with motor trucks, the primary object of the invention being to provide a trailer equipped with a motor, thereby doubling the power of the truck with the resultant increase of load capacity.

Another object of the invention is to provide a power trailer so constructed that the engine forming a part of the trailer will not in any way interfere with the load or operation of the trailer.

With the foregoing and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 1 is a plan view of a trailer constructed in accordance with the invention, the hood of the engine being shown in section.

Figure 2 is a rear elevational view of the trailer.

Figure 3 is a sectional view taken on line 3—3 of Figure 1.

Figure 4 is a side elevational view of the trailer.

Figure 5 is a sectional view taken on line 5—5 of Figure 1.

Referring to the drawings in detail, the trailer comprises a rear axle 5 that includes a differential not shown.

The reference character 6 designates the side rails of the frame of the trailer, and as shown extend rearwardly where they are secured to the axle housing in which the axle 5 operates.

These side rails 6 are formed preferably of angle bar material, and as shown have upwardly extended end portions 7 that terminate in horizontal end portions 8, the portions 7 converging at their free ends, where they are secured together by means of the plate 9 which is bolted to the portions 8 of the side rails, by means of the bolts 10. The member 9 is connected with the king bolt 11, which in turn is connected with the bolster 12 of the truck, with which the trailer is used.

The motor of the trailer is indicated by the reference character 13 and is provided with the usual crank case 14 and drive shaft that extends into the rear axle housing to operate the differential supported therein.

Connected with the side rails 6 of the frame of the trailer, are bands 15 that provide the support for the engine, the construction of the bands being such that the engine will be supported below the bolster 16 and bolster 17 of the trailer and truck, to the end that poles or beams positioned on the bolsters 16 and 17 will not interfere with the engine of the trailer.

The bolster 17 is substantially wide and is secured in position by means of the rods 18 that pass through the plate 19 forming a part of the axle housing, the upper ends thereof being extended through openings in the plates 20. Nuts 21 are provided on the threaded ends of the rods 18 for securing them in position.

It will of course be obvious that a suitable transmission and operating mechanism will be employed for controlling the trailer, the operating mechanism being of a construction so that it may be operated from the operator's seat. Wheels 27 are mounted on the shaft 5 and support the rear end of the trailer.

I claim:

A motor trailer comprising a wheel supported axle, a frame embodying side rails mounted on the axle, the forward ends of said side rails embodying upwardly and forwardly extended converging portions, a bolster mounted above the axle, said bolster lying in a plane with the forward ends of the side rails to support material thereon, an engine mounted on the frame and disposed below the upper surface of the bolster and forward ends of the side rails.

In testimony that I claim the foregoing as my own, I have hereunto affixed my signature.

WALTER WILLIAM BRISSON.